March 27, 1962 P. A. PLASSE ET AL 3,027,271
PRESSURE SENSITIVE ADHESIVE SHEET MATERIAL HAVING
A PROTECTIVE COATING OF HEAT REMOVABLE MATERIAL
Filed Dec. 3, 1957

INVENTORS
PAUL A. PLASSE
ROBERT E. POLITI
BY
ATTORNEY 3,027,271
PRESSURE SENSITIVE ADHESIVE SHEET MATE-
RIAL HAVING A PROTECTIVE COATING OF
HEAT REMOVABLE MATERIAL
Paul A. Plasse, Lexington, and Robert E. Politi, Win-
chester, Mass., assignors, by mesne assignments, to
Oliver Machinery Company, Grand Rapids, Mich., a
corporation of Michigan
Filed Dec. 3, 1957, Ser. No. 700,379
11 Claims. (Cl. 117—76)

This invention relates to adhesives and more partic-
ularly to adhesives which are activated by heat and ap-
plied by means of pressure, and to supporting stock coated
with such an adhesive, and is a continuation-in-part of
Serial Number 539,026, filed in our names on October 6,
1956, and now abandoned.

There exists a great demand for labels, tags, tape, etc.,
which have an adhesive backing which permits their at-
tachment by pressure to a wide variety of surfaces. A
few examples would include labels to mark and seal
foodstuff packages, small labels or tags for indicating the
price of an item, and tapes for medical or drafting pur-
poses to hold such things as bandages, paper, etc., in
place.

The usual pressure-sensitive adhesives, and particularly
those used in large quantities for industrial purposes,
must be protected by suitable interleaving sheets such as
treated or coated kraft paper. Such interleaving or pro-
tective sheets used to prevent the adhesion of one layer
to another when layers are stacked or rolled, must be re-
moved and disposed of. This means that provision must
be made to remove the interleaf material from its normal
position over the pressure-sensitive adhesive surface be-
fore the pressure-sensitive treated surface can be applied
to the surface for which it is intended. The interleaving
sheets add weight and volume to the tape, labels, etc.,
coated with pressure-sensitive adhesive, and the interleaf
material is initially expensive, a fact which adds mate-
rially to the cost of the labels, tapes, etc., since the inter-
leaf material is usually not recoverable.

Alternatively, if a protective interleaving material is
not used, it is necessary to coat the obverse side of the
stock with a so-called release coating (see for example
U.S. Patent 2,648,614). This means an additional step
in the manufacture of the final product having the ad-
hesive coating. Moreover, it is not feasible to try to
print or write on a release coating.

A truly pressure-sensitive adhesive coated sheet or stock
cannot easily be processed (for example die cut, printed
or perforated) except in special equipment, or unless the
pressure-sensitive adhesive surface is covered with the
interleaf material, as the pressures involved in these op-
erations normally cause the pressure-sensitive adhesive
surface to stick to the conventional supporting surface
of the printing press. However, even when interleaf ma-
terial is used in die cutting, printing, perforating, etc.,
difficulty is still encountered in removing the interleaving
material from the cut, printed or perforated items, par-
ticularly if the items are intricate in shape. This is caused
when the bond between the pressure-sensitive adhesive
and the interleaf sheet is greater than the tear resistance
of the stock or backing to which the pressure-sensitive ad-
hesive has been applied. For example, labels having an
intricate shape or having a large number of indexing
notches may be easily torn in removing the interleaf ma-
terial before application, particularly if automatic removal
of the interleaf is attempted. Thus, added to the extra
expense, weight and volume of the interleaf material is
the possibility of wasting the pressure-sensitive adhesive
coated stock itself. Coating the obverse side with a re-
lease coating does not eliminate the use of an interleaf
material if stock coated with a pressure-sensitive material
is to be die cut, printed or perforated.

There are in addition to pressure-sensitive adhesives,
so-called heat-activatable adhesives. These are thermo-
plastic compositions which are non-tacky under normal
temperature conditions, but which become tacky when
heated. In using these heat-activatable adhesives it is
necessary to apply heat and pressure simultaneously, since
the adhesive reverts to a non-tacky condition instantly or
almost instantly upon being reduced to a normal room
temperature. Thus final application of such items as tape,
labels, etc., having a heat-activatable adhesive must be
accomplished at the time heat is applied. A recent vari-
ant of the heat-activatable adhesive is the so-called "de-
layed tack" adhesive (see for example U.S. Patent
2,678,284). These delayed tack adhesives contain a sub-
stantial amount of crystalline solid plasticizer along with
a resin. When they are subjected to heat the plasticizer
and resin phases are blended to form an armorphous,
tacky mass which will remain tacky, when cooled to room
temperature, for a finite period of time which is deter-
mined by the adhesive composition. The delayed tack
adhesives may also give a positive or permanent seal
which cannot conveniently be separated or broken after
a period of time or be easily removed and reattached to
another surface.

In view of the above discussed operational difficulties
inherent in the pressure-sensitive and the heat-activatable
adhesives it is desirable to find an adhesive material which
does not exhibit these limitations.

It is therefore an object of this invention to furnish
an adhesive which becomes and remains pressure-sensitive
in type after having been raised to an activating tempera-
ture, the adhesive before activation being non-pressure-
sensitive and requiring no interleaf material. Another
object is to provide an adhesive which permits printing
or stamping on the obverse side of the stock or backing
after the adhesive has been applied without the use of any
interleaf material. It is a further object to furnish an
adhesive which permits simultaneously die cutting or per-
forating a number of layers of stock coated with ad-
hesive without using interleaving sheets and without caus-
ing the layers to stick together.

It is still a further object to furnish a pressure-sensitive
adhesive which does not require a removable protective
interleaving sheet and which therefore eliminates the
added weight, volume and cost of the protective sheet.
It is still another object of this invention to furnish an
adhesive which may be activated by heat and applied any
time thereafter. It is an additional object to provide an
adhesive which may be stored and handled as either a
heat activatable, pressure-sensitive adhesive or as a pres-
sure-sensitive adhesive. It is still another object to pro-
vide an adhesive which may be used to coat both sides
of stock material which may be rolled or stacked after
coating without the use of protective sheets between lay-
ers. These and other objects will become apparent in
the following discussion.

The improved heat-activatible pressure-sensitive ad-
hesive of this invention comprises a tacky or pressure-
sensitive layer and a dry powder layer thereon. The
tacky layer is of the permanently pressure-sensitive type
and comprises a combination of one of more elastomers
and one or more tackifiers, the ratio being adjusted so
that the final tacky layer has a penetration value within
a given range. The dry powder layer is removable by
heat, i.e., by vaporization or decomposition into gaseous
products, the removal step being accomplished at a tem-
perature below that at which any appreciable degradation
of the pressure-sensitive adhesive takes place.

When stock or backing is surface-coated with the ad-
hesive of this invention, it may be rolled up on itself, stacked or otherwise handled without any possibility of adhering to contiguous layers or to any other surface until the powder layer has been removed by heat. When the dusting powder is removed the tacky portion of the adhesive is pressure-sensitive. During the time the dusting powder covers the tacky portion of the adhesive the stock may be conveniently handled and processed, e.g., printed on, stamped, die cut into forms, perforated, etc.

As noted above, the tacky layer of the adhesive of this invention may be of any pressure-sensitive type possessing a certain penetration value. The composition of this tacky layer is adjusted so that it will have a penetration value of between about 30 and about 65 when measured according to ASTM test D5–52. These values are based upon the use of a 50-gram load on the penetrating needle applied for 5 seconds while the sample is maintained at 115° F. (See for example, "ASTM Standards," 1955 edition, Part 3, pages 1643–1645.)

Penetration may be defined as the consistency of a material expressed as the distance that a standard needle penetrates vertically into a sample of the material under known conditions of load, time and temperature. The units thus measured are in tenths of a millimeter.

The control of the penetration of the adhesive of this invention is important for if the penetration values are less than 30 (by the standard set forth herein) the adhesive would be too hard, and not satisfactorily pressure-sensitive. On the other hand, if the penetration value is appreciably above about 65, the adhesive is too soft, the powder layer would tend to sink into the tacky layer thus destroying the effect of the powder layer making the adhesive subject to blocking and undesirable handling characteristics in general.

Suitable compositions for the tacky layers comprise an elastomer, a tackifier and any necessary additives. The elastomeric component is preferably chosen from the synthetic or natural rubbers or the flexible linear polymers. Typical elastomers include, but are not limited to, natural rubber, butyl rubber, GRS, neoprene, butadiene-styrene copolymers, polyisobutylene and acrylic resins. In choosing the elastomeric component of the tacky layer it may be found preferable to use mixtures of elastomers having different molecular weights to achieve the desired degree of adhesiveness. For example, a mixture of 67% by weight of a medium-molecular weight polyisobutylene and 33% by weight of a high-molecular weight polyisobutylene has been found to give a very effective pressure-sensitive adhesive when mixed with a suitable tackifier to give the desired penetration range.

The primary purpose in adding a tackifier is to obtain the desired degree of tackiness and thus to control the penetration. Generally, it will be possible to control the penetration value of the tacky layer by controlling the percent of tackifier present. Many such tackifiers are known in the art and include but are not limited to rosin esters, modified and unmodified terpene resins, polybutenes (formed by the catalytic polymerization of normal and branched-chain butenes), and polymerized hydrocarbon resins.

The elastomeric and tackifier components in any one tacky or pressure-sensitive composition are chosen from those components which are compatible with each other and which also give the desired degree of adhesiveness and penetration values.

Additives in the tacky layer may include plasticizers and fillers to impart the proper degree of plasticity and flexibility to the elastomer-tackifier combination, antioxidants to control or prevent the slow oxidation of the adhesive layer and thus to prevent its loss of adhesive characteristics, and other materials such as pigments, etc. Fillers include such modifying agents as the so-called rubber substitutes or washed clay which serve to take the "nerve" out of rubber-type adhesive. This is desirable because the final pressure-sensitive adhesive should not possess any great degree of elasticity, particularly if the adhesive is to be calendered on the backing stock. Additives such as vulcanized vegetable oils do this without softening the rubber as a plasticizer would do.

In addition to controlling the penetration of the tacky layer, it is also desirable to control the thickness of this layer. An amount of pressure-sensitive or tacky material should be deposited to give a minimum final thickness of about 0.3 to 0.4 mil. The amount of tacky layer material initially applied to the backing will depend upon the type of the backing to be coated, e.g., material such as cellophane will require less of the tacky layer material than rough or porous backing because of the tendency of the tacky layer material to penetrate into the latter. If final thicknesses of less than .3 mil are used, the adhering qualities of the item to be made adhesive are not great enough.

Although it would be possible to put on very thick layers of the pressure-sensitive or tacky layer material, this is not practical from an economic point of view and the final thickness will be governed by the adhesive qualities desired.

The tacky layer or pressure-sensitive portion of the adhesive of this invention may be deposited upon a backing surface either from a solution or a dispersion, or in the form of a hot melt. These are illustrated in the examples given below. Such solutions, dispersions and hot melts may be applied to the stock by any suitable technique known in the art. Such techniques include calendering, knife-coating, roller coating and the like.

The dusting powder should preferably be a material which can be finely powdered for dusting and which is not appreciably compatible with the pressure-sensitive layer, but which remains distinct from it. The dusting powder must be removable by application of heat through volatilization or decomposition into gaseous products. Dusting powders should be fine enough to pass a standard 60-mesh sieve and preferably a 100-mesh sieve. This means that the dusting powder should have an average maximum diameter of $250\mu$ and preferably of $150\mu$. The powders may be as fine as obtainable.

Dusting powders which meet these requirements include, but are not limited to, benzoic acid and naphthalene which volatilize, and ammonium bicarbonate, ammonium carbonate and morpholine carbonate which decompose primarily to ammonia, carbon dioxide and water vapor.

The dusting powder should also be capable of maintaining its effectiveness under the conditions of storage to which the adhesive-coated stock is exposed. In choosing the proper dusting powder it should be noted that in general those powders which have relatively high temperatures of decomposition or volatilization maintain their effectiveness for longer periods of time under normal storage conditions than those powders requiring lower temperatures for activation. Hence for example, benzoic acid, which volatilizes less rapidly than naphthalene at any given temperature, is better suited than naphthalene for adhesives which must be stored for prolonged periods. However, the adhesive-coated stock (labels, etc.) may be wrapped or otherwise protected from the air, thus making it possible to use dusting powders which volatilize or decompose relatively rapidly at any given temperature. In effect, packaging the adhesive-coated stock means the establishment of a certain concentration of vapor which in turn, because of the relationship of the partial pressure of the materials, prevents further volatilization or decomposition.

The amount of dusting powder is substantially independent of the thickness of the tacky layer since only that amount of dusting powder required to cover the surface of the tacky layer is needed. The size of the powder granules will influence the weight of the powder layer, i.e., the larger the particles, the greater the powder layer weight. Generally, the weight of dusting powder will range from about 6 to about 12 pounds per ream (3000 square feet).

The dusting powder layer may be put on the tacky surface in several ways. One convenient procedure is to cover the tacky surface with an excess of the finely ground dusting powder and then to shake over or otherwise remove the excess (i.e., that which does not adhere) and re-use it. However, when the dusting powder is applied in this manner, the final surface of the heat activatible pressure-sensitive adhesive tends to be somewhat abrasive.

Another procedure which eliminates the abrasive quality of the dusting power is to ball-mill or otherwise disperse the finely ground powder in a liquid medium which is a non-solvent for both the dusting powder and the pressure-sensitive portion of the adhesive. This dispersion may then be coated on the pressure-sensitive portion in any suitable manner such as roller or knife-coating.

Alternately, the dispersion of the dusting powder may be prepared in a liquid medium which is a solvent for the pressure-sensitive portion of the adhesive. The dispersion is applied to the pressure-sensitive portion by any suitable process as mentioned above and the liquid driven off by heating, for example, to about 130° F. in an air-circulating oven. The use of a liquid medium which is a solvent for the pressure-sensitive portion achieves excellent adhesion or anchoring of the finely divided powder to the pressure-sensitive layer and gives a non-abrasive top surface.

The dusting powder may also be put on in a liquid medium which is a solvent for the dusting powder and a non-solvent for the pressure-sensitive portion. The solution of the dusting powder is applied in a manner similar to that used for the dispersions, and the resulting top surface of the heat-activatable, pressure-sensitive adhesive is a non-abrasive film-type coating of the dusting powder.

The stock to be coated with the adhesive of this invention may be any flexible material which has the necessary strength for the purpose to which the final item such as price tag, label, tape, etc., is to be put. Typical stock material may include, among other things, cellulosic materials such as paper and cotton cloth, synthetic polymeric materials made into fibers or films of a desired thickness or strength, and metal foils such as aluminum, gold, etc. The adhesive may also be applied to rigid or non-flexible stock such as wood, cardboard, metal pieces, etc.

Stock coated with the adhesives of this invention may be stacked, rolled or otherwise put up for use on the market.

The adhesive of this invention may be further described with reference to the accompanying drawings in which.

Figure 1:
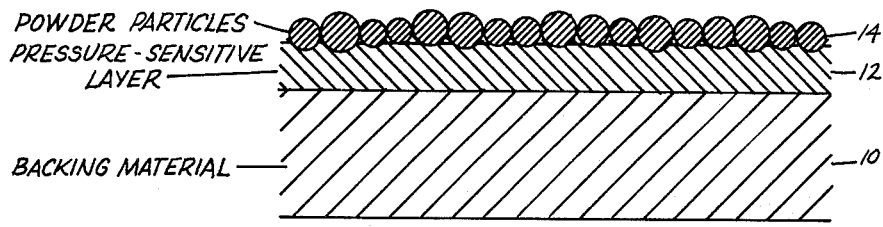
FIG. 1 is a greatly enlarged cross-section of a portion of supporting material having one surface covered with the adhesive of this invention.
Figure 2:
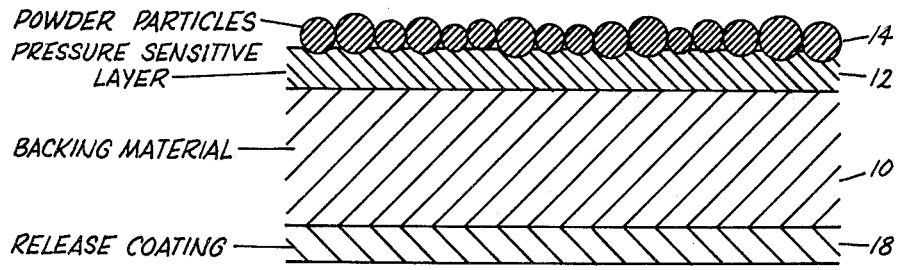
FIG. 2 is a cross-sectional representation of a modification of this invention.

FIGS. 1 and 2, in which like numbers refer to like elements, are greatly enlarged and somewhat simplified cross-sectional representations of a backing material having one side coated with the adhesive of this invention. In these figures backing material 10 has a coating 12 of pressure-sensitive adhesive the surface of which is covered with particles of a dry powder 14. In FIG. 2 the backing 10 has a release coating 18 on the obverse side, thus providing a final adhesive-coated material which can be rolled or stuck on itself after heat activation.

The following examples, which in no way are meant to limit the scope of this invention, illustrate typical formulations for the adhesive of this invention.

*Example I*

38 grams of a medium molecular weight polysiobutylene (sold as Vistanex L-80 by Enjay Company, Inc.), 19 grams of a high molecular weight polyisobutylene (sold as Vistanex 140), 35 grams of polybutene (polymerized normal and branch chain butenes), 7 grams of a crude styrene resin melting at about 125° C. (sold as Piccolastic E-125 by Pennsylvania Industrial Chemical Corp.) and one gram of stearic acid were milled on a rubber mill and the mass thus formed was put into a churn with sufficient low boiling naphtha to form a 20% solids solution. After thorough mixing, this solution was knife-coated on 55-pound label stock (3000 square feet/ream) to form the pressure-sensitive portion of the adhesive. The final pressure-sensitive layer had a thickness of about 1 mil and a penetration value of 50, after being dried at 130° F. in an air-circulating oven. This tacky, or pressure-sensitive, surface was dusted with an excess of ammonium bicarbonate and that portion of the powder which did not adhere to the surface was removed. Samples of this coated stock were stacked one on the other, and a pressure of 2.5 p.s.i. was applied for three days at 115° F. Under these conditions no blocking occurred.

*Example II*

55-pound label stock (as in Example I) was coated with the pressure-sensitive adhesive of Example I. For the top or dried powder layer a dispersion was prepared by ball-milling 30 grams of ammonium bicarbonate in 70 grams of a low-boiling naphtha, the naphtha being a solvent for the pressure-sensitive portion of the adhesive and a non-solvent for the dusting powder material. The resulting dispersion was knife-coated on the pressure-sensitive adhesive portion and the coated stock was then dried at about 130° F. in an air-circulating oven. The use of a solvent for the pressure-sensitive portion as a dispersing agent for the dry powder resulted in excellent adhesion or anchoring of the resulting finely divided dry powder to the pressure-sensitive portion. The powder layer was non-abrasive.

*Example III*

A sample strip of 55-pound label stock (3000 square feet/ream) was coated with a pressure-sensitive adhesive formulated in the manner described in Example I.

A dispersion of ammonium bicarbonate was made up by ball-milling 40 grams of ammonium bicarbonate and 60 grams of ethyl alcohol (a non-solvent for the pressure-sensitive adhesive) for 16 hours to form a fine particle size dispersion. This dispersion was then knife-coated on the tacky or pressure-sensitive label stock and dried at about 130° F. in an air-circulating oven. The resulting heat activatable, pressure-sensitive adhesive had as its top surface very fine, non-abrasive particles firmly attached to the pressure-sensitive portion.

*Example IV*

55-pound label stock (3000 square feet/ream) was coated with a pressure-sensitive layer as described in Example I. 40 grams of ammonium carbonate were dissolved in 60 grams of water and sprayed on the pressure-sensitive layer thus deposited on the label stock. The finally coated stock was then dried at about 130° F. in an air-circulating oven. The ammonium carbonate thus deposited was in the form of very fine, non-abrasive dust.

In a similar manner 25 grams of benzoic acid was dissolved in 75 grams of ethanol and knife-coated on strips of the label stock having the polyisobutylene base pressure-sensitive adhesive of Example II. The finally coated stock was dried at about 130° F. The benzoic acid was present in the form of a film-like coating which if rubbed or abraded became a very finely divided powder firmly attached to the pressure-sensitive portion of the adhesive.

*Example V*

55 grams of a copolymerized butadiene-styrene latex (48 percent solids; sold by the Dow Chemical Co., as latex 512R) as the elastomeric component and 25 grams of an aqueous emulsion of a polymerized hydrocarbon resin (50 percent solids; sold by the Pennsylvania Industrial Chemical Corp., as Piccopale XA-22 Emulsion) as the tackifier were mixed with moderate stirring. In a separate container a softener consisting of 42.2 percent by weight mineral oil emulsion (50% mineral oil), 1.2% morpholine, 5.2% oleic acid and 51.4% water was prepared. 20 grams of this softener was mixed into the latex-hydrocarbon mixture and stirred at room temperature to form the tacky layer material. This composition was then coated on cellophane (600 PT made by E. I. du Pont de Nemours Company, Inc.,) to a thickness of 0.8 mil (dry film thickness) and dried at 220° F. in an air-circulating oven. The tacky layer had a penetration value of 45, measured with a standard ASTM needle with a 50-gram load for 5 seconds at 115° F. After drying the tacky surface was dusted with an excess of ammonium bicarbonate to cover the entire surface. That portion of the ammonium bicarbonate which did not adhere to the surface was then removed. Samples of this coated paper were stacked one on the other, and a pressure of 2.5 p.s.i. was applied for three days at 115° F. Under these conditions no blocking occurred.

*Example VI*

A dry composition suitable for applying as a hot melt was made up by mixing 30 grams of a medium-molecular weight polyisobutylene (sold as Vistanex L-80 by Enjay Co., Inc.) as the elastomeric component; 13 grams of a terpene resin having a melting point of 70° C., and 23 grams of polybutene (designated Polybutene 128 and sold by Oronite Chemical Company) as tackifiers; and 17 grams of a washed clay and 17 grams of a sulphur chloride vulcanized vegetable oil as additives to adjust the elasticity of the polyisobutylene. These ingredients were mixed in a rubber mill heated to slightly above 300° F. The molten adhesive was applied to 55-pound label stock paper (3000 square feet/ream) to a thickness of 2 mils with hot calendar rolls. After cooling under chilled rolls, the coated surface, having a penetration value of 45, was dusted with benzoic acid, the excess powder was removed and the paper rewound. The final adhesive contained about 8 pounds of dust per ream of paper.

This adhesive coated paper was tested for blocking in the same manner as described in Example I, and was found to exhibit essentially no blocking.

*Example VII*

670 grams of a medium-molecular weight polyisobutylene (sold as Vistanex L-80 by Enjay Co., Inc.) and 330 grams of a high-molecular weight polyisobutylene (sold as Vistanex L-140 by Enjay Co., Inc.) were mixed to form the elastomeric fraction of a pressure-sensitive adhesive.

A tackifier fraction was prepared by mixing 400 grams of a terpene resin having a melting point of 70° C. (sold by Pennsylvania Industrial Chemical Corp., and Piccolyte S-70) and 600 grams of a viscous polybutene (polymerized normal and branched-chain butenes sold as Polybutene 128 by Oronite Chemical Co.).

A series of 8 pressure-sensitive adhesives (see tabulation) were made up of varying elastomer/tackifier ratios, by rubber milling the proper amounts of elastomeric and tackifier fractions until mixing was complete. The mixture was then removed from the rubber mill and sufficient low-boiling naphtha was added to make a 20% solution based on the weight of solids present. The resulting adhesives were coated on 55-pound label stock (3000 square feet/ream) to a thickness equivalent to a 1.2 mil dry film thickness and penetration values were determined employing ASTM test D5-52 using a 50-gram load for 5 seconds at 115° F. Ammonium carbonate was then dusted on to give a dry powder layer equivalent to 12 pounds of powder per ream of this paper.

The results of the penetration value determination are given below.

| Weight Percent Elastomer | Weight Percent Tackifier | Penetration Value |
|---|---|---|
| 100 | 0 | 20 |
| 90 | 10 | 27 |
| 80 | 20 | 30 |
| 75 | 25 | 35 |
| 50 | 50 | 52 |
| 40 | 60 | 64 |
| 33 | 67 | 82 |
| 0 | 100 | 360 |

The pressure-sensitive adhesives having penetration values under 30 were not sufficiently pressure-sensitive to serve as the type of adhesives desired. The pressure-sensitive adhesives having penetration values above about 65 were too soft, and even with the dry powder layer, they tended to block when exposed to the test described in Example I. Moreover, the dry powder layer had a tendency to sink into the pressure-sensitive or tacky layer.

*Example VIII*

A formulation containing 200 g. butyl rubber, 100 g. terpene resin and 40 g. polybutene (product of the catalytic polymerization of normal and branched chain butenes) was prepared in a rubber mill, and the plastic mass was calendered on sheets of kraft paper to form the tacky layer 2 mils thick and having a penetration value of 60. Three separate sample strips of the coated paper were dusted with powdered benzoic acid, ammonium bicarbonate, ammonium carbonate, respectively. No appreciable blocking was observed.

Other stock such as cellophane or aluminum foil may be similarly coated in accordance with the procedure of the above examples.

The adhesive sides of the stock samples of the foregoing examples were dry to the touch and the separate strips could be stacked or rolled upon each other without adhering. The obverse side of the coated paper could be printed in a printing press, and the stock could be stamped, die cut singly or in stacks and perforated by mechanical means. In an unactivated state the coated stock, or labels, etc., remained permanently insensitive to pressure until heat was applied. The amount of heat required to activate the adhesive will, of course, vary, but the adhesive should not be raised to a temperature high enough to degrade either the stock or the tacky layer. When heat was applied to the obverse side of the samples, the dusting powder was sublimed or decomposed and the reverse side became tacky. This tacky quality remained and the tape or strip could be affixed to any surface by merely contacting the surface with the tacky side and applying only sufficient pressure to smooth it down.

The permanence of the adhesive depends upon the relative strength of the stock and the surface to which the stock is affixed. Thus if the stock is strong and an adhesive-coated piece is affixed to a piece of metal or other strong surface, the former can be removed by pulling it off. If on the other hand, either the stock or the surface to which it is affixed is easily torn (e.g., a thin paper), separation of the stock from the surface would be difficult if not impractical.

Stock or labels, tape, etc., which is coated with the adhesives of this invention may be marketed in two forms, i.e., in the heat-activatable form or the pressure-sensitive form. Thus, if the adhesive is not activated by heat before the stock on which it is placed is sold, it is a heat-activatable adhesive with the added advantage of not having to be applied immediately after activation. If the adhesive is heat activated before the items on which it is placed are marketed, then it remains a pressure-sensitive adhesive, ready for application by means of pressure at any time thereafter. If the adhesive is activated in advance and the stock is rolled on itself or stacked up, then it is desirable to coat the obverse side of the stock with a release coating in order that the adhesive will be retained exclusively on the reverse side. Such release coating may conveniently be vinyl blends, or compositions such as hydroxyethyl cellulose and a chromium salt of an acyclic carboxylic acid as disclosed in U.S. Patent 2,648,614.

The ability to activate the adhesive and thus convert it to a pressure-sensitive condition for use when desired, in accordance with this invention, makes it possible to provide a coated stock particularly well suited for use in automatic handling equipment. Thus, apparatus may be designed to take advantage of the fact that before activation, stock can be handled without regard for tackiness and that heat can be automatically applied just before use or at any convenient time. If stock coated with the conventional pressure-sensitive type of adhesive is used in automatic sealing equipment, it is necessary that the equipment be able to remove and dispose of the interleaf sheet normally found used with this type of stock. On the other hand, if stock coated with the adhesive of this invention has not been treated to activate the adhesive to the pressure-sensitive state no interleaf sheets would be required and any automatic labeling equipment would not have to handle and dispose of an interleaf sheet. This means that automatic equipment for handling the material coated with the adhesive of this invention may be simpler and more trouble-free than automatic equipment for handling conventional pressure-sensitive adhesives.

In addition to the more-or-less conventional arrangement of having printing on one side and adhesive on the opposite side such as in decorative tapes, labels, etc., the adhesive of this invention permits a wide degree of flexibility in varying such an arrangement. Thus, for example, the adhesive of this invention may be placed on both sides of a supporting stock and before heat activation such stock as tape, or similar material, may be rolled upon itself or stacked without the use of the interleaf sheet which must be used for conventional pressure-sensitive adhesives.

Another variant within the scope of this invention makes use of the fact that the adhesive of this invention, once it has been activated by heat (i.e., the dusting powder has been removed) may be transparent. This permits printing on the stock and subsequently applying the adhesive over the printing. Such a variant would be convenient, for example, in making a label which is to be applied to the outside of a transparent item, for instance a glass bowl or bottle, which is to be read through the transparent wall and which may be more easily applied to the outside surface from the standpoint of labeling operations. Of course, such a label or tape may be printed on both sides.

From the above, it will be seen that the adhesives of this invention possess the advantages inherent in pressure-sensitive adhesives without having their inherent drawbacks such as inability to print or stamp on the adhesive-coated stock and need for a protective extra sheet. Thus, by providing an adhesive which is not pressure-sensitive at normal room temperatures, or the temperatures found in ordinary manufacturing and processing operations, it is possible to print, die cut, perforate, etc., the final adhesive-coated items without encountering the handling difficulties encountered with a conventional pressure-sensitive adhesive.

Further, the adhesive of this invention eliminates the use of interleaving or protective sheets, a fact which reduces initial cost and also reduces handling volumes and weights. In addition, the elimination of the interleaf sheet still permits the manufacture of labels, etc., in roll form and materially simplifies the development of automatic labeling machinery intended to apply the label with much more facility than possible using those conventional pressure-sensitive adhesives requiring interleaf sheets.

The adhesives of this invention also possess the advantage over ordinary heat-activatable adhesives in that they may be used any time after activation without the possibility of their losing their effectiveness after a certain length of time.

The adhesives of this invention offer several choices for handling and use, i.e., as a heat-activatable, pressure-sensitive adhesive, or as a pressure-sensitive adhesive which has been previously activated, and also offer the possibility of a number of variants such as printing under the adhesive and applying adhesive to both sides of stock.

We claim:

1. Heat-activatable, pressure-sensitive material which remains non-tacky at room temperature and under printing pressures, comprising supporting stock coated on at least one side with an adhesive, said adhesive consisting essentially of a pressure-sensitive layer which consists essentially of an elastomer and a tackifier and which has a penetration value ranging from about 30 to about 65 when a 50-gram load is applied for 5 seconds at 115° F. according to ASTM test D5–52 and a covering of a dry layer of finely divided discrete particulate material which is volatile and is removable in the form of gaseous products at an elevated temperature which is below the temperature of degradation of said pressure-sensitive layer thereby to expose said pressure-sensitive layer.

2. Material in accordance with claim 1 wherein said supporting stock is cellulosic material.

3. Material in accordance with claim 1 wherein said supporting stock is synthetic polymeric sheet material.

4. Material in accordance with claim 1 wherein said supporting stock is metal foil.

5. Heat-activatable, pressure-sensitive material in accordance with claim 1 further characterized in that said volatile discrete particulate matter is selected from the group consisting of benzoic acid, naphthalene, ammonium bicarbonate, ammonium carbonate, and morpholine carbonate.

6. Heat-activatable, pressure-sensitive sheet material comprising suporting stock printed on the obverse side and coated on the reverse side with an adhesive, said adhesive consisting essentially of a tacky layer and a dry layer of finely divided discrete particulate material, said tacky layer being permanently pressure-sensitive and consisting essentially of an elastomer fraction and a tackifier and having a penetration value ranging from about 30 to about 65 when a 50-gram load is applied for 5 seconds at 115° F. according to ASTM test D5–52, said dry layer being volatile and being removable in the form of gaseous products upon heating said adhesive to a temperature below that at which any appreciable degradation of said tacky layer place thereby to expose said tacky layer.

7. Method of making a heat-activatable, pressure-sensitive adhesive sheet material, comprising the steps of coating at least one side of said sheet material with a pressure-sensitive adhesive layer consisting essentially of an elastomer and a tackifier, and depositing thereon a dry layer of volatile finely divided discrete particulate material to completely cover said pressure-sensitive material and to protect it until heat is applied, said pressure-sensitive adhesive having a penetration value ranging from about 30 to about 65 when a 50-gram load is applied for 5 seconds in 115° F. according to ASTM test D5–52.

8. Method in accordance with claim 7 wherein said step of depositing said dry layer comprises forming a dispersion of said volatile finely divided discrete particulate material in a liquid and applying said dispersion over said pressure-sensitive adhesive layer, said liquid being a non-solvent for said finely divided material and for said pressure-sensitive adhesive.

9. Method in accordance with claim 7 wherein said step of depositing said dry layer comprises forming a dispersion of said volatile finely divided discrete particulate material in a liquid and applying said dispersion over said pressure-sensitive adhesive layer, said liquid being a non-solvent for said finely divided material and a solvent for said pressure-sensitive adhesive.

10. Method in accordance with claim 7 wherein said step of depositing said dry layer comprises forming a solution of said volatile finely divided discrete particulate material and applying said solution to said pressure-sensitive adhesive layer, the solvent used to form said solution being a non-solvent for said pressure-sensitive adhesive.

11. Method of making a heat-activatable, pressure-sensitive adhesive sheet material, comprising the steps of coating at least one side of said sheet material with a pressure-sensitive adhesive layer consisting essentially of elastomer and a tackifier, depositing thereon a dry layer of volatile finely divided discrete particulate material to completely cover said pressure-sensitive material and to protect it until heat is applied, said pressure-sensitive adhesive having a penetration value ranging from about 30 to about 65 when a 50-gram load is applied for 5 seconds in 115° F. according to ASTM test D5–52, and, prior to affixing said sheet material to a surface, heating said sheet to a temperature sufficient to remove said finely divided particulate material as gaseous products but below that temperature which would degrade said sheet and said pressure-sensitive adhesive.

References Cited in the file of this patent

UNITED STATES PATENTS

| | | |
|---|---|---|
| 2,106,133 | Goldman | Jan. 18, 1938 |
| 2,257,167 | Gerhardt et al. | Sept. 30, 1941 |
| 2,264,628 | Engert et al. | Dec. 2, 1941 |
| 2,328,057 | Coulter | Aug. 31, 1943 |
| 2,481,895 | Ziegler | Sept. 13, 1949 |
| 2,572,458 | Eustis | Oct. 23, 1951 |
| 2,648,614 | Martin et al. | Aug. 11, 1953 |
| 2,678,284 | Holt | May 11, 1954 |
| 2,765,241 | Wayne | Oct. 2, 1956 |
| 2,768,906 | James | Oct. 30, 1956 |
| 2,878,142 | Bohaty | Mar. 17, 1959 |

FOREIGN PATENTS

| | | |
|---|---|---|
| 804,046 | Germany | Apr. 16, 1951 |